United States Patent
Eitouni et al.

(10) Patent No.: US 9,923,234 B2
(45) Date of Patent: Mar. 20, 2018

(54) LONG CYCLE LIFE LITHIUM SULFUR ELECTROCHEMICAL CELLS

(71) Applicant: Seeo, Inc, Hayward, CA (US)

(72) Inventors: Hany Basam Eitouni, Oakland, CA (US); Mohit Singh, Berkeley, CA (US)

(73) Assignee: Seeo, Inc., Hayward, CA (US)

( * ) Notice: Subject to any disclaimer, the term of this patent is extended or adjusted under 35 U.S.C. 154(b) by 335 days.

(21) Appl. No.: 14/260,918

(22) Filed: Apr. 24, 2014

(65) Prior Publication Data

US 2014/0322614 A1 Oct. 30, 2014

Related U.S. Application Data

(60) Provisional application No. 61/817,248, filed on Apr. 29, 2013.

(51) Int. Cl.
*H01M 10/0565* (2010.01)
*H01M 10/052* (2010.01)
(Continued)

(52) U.S. Cl.
CPC ....... *H01M 10/0565* (2013.01); *H01M 4/136* (2013.01); *H01M 4/623* (2013.01);
(Continued)

(58) Field of Classification Search
CPC ....... H01M 4/36; H01M 4/62; H01M 10/0565
See application file for complete search history.

(56) References Cited

U.S. PATENT DOCUMENTS 5,061,581 A 10/1991 Narang et al.
5,324,599 A 6/1994 Oyama
(Continued)

FOREIGN PATENT DOCUMENTS

JP 2013229257 A 11/2013
WO 2009146340 A1 12/2009
(Continued)

OTHER PUBLICATIONS

Juchen Guo, Yunhua Xu, and Chunsheng Wang, Sulfur-Impregnated Disordered Carbon Nanotubes Cathode for Lithium-Sulfur Batteries, Sep. 19, 2011, NanoLetters.*
(Continued)

*Primary Examiner* — Sarah A. Slifka
*Assistant Examiner* — Brian R Ohara
(74) *Attorney, Agent, or Firm* — R'Sue Popowich Caron

(57) ABSTRACT

A sulfur-based cathode for use in an electrochemical cell is disclosed. The sulfur is sequestered to the cathode to enhance cycle lifetime for the cathode and the cell. An exemplary sulfur-based cathode is coupled with a solid polymer electrolyte instead of a conventional liquid electrolyte. The dry, solid polymer electrolyte further acts as a diffusion barrier for the sulfur. Together with a sequestering matrix in the cathode, the solid polymer electrolyte prevents sulfur capacity fade that occurs in conventional liquid electrolyte based sulfur systems. The sequestering polymer in the cathode further binds the sulfur-containing active particles, preventing sulfur agglomerates from forming, while still allowing lithium ions to be transported between the anode and cathode.

19 Claims, 6 Drawing Sheets

(51) Int. Cl.
*H01M 4/136* (2010.01)
*H01M 4/62* (2006.01)
(52) U.S. Cl.
CPC ......... *H01M 4/624* (2013.01); *H01M 10/052* (2013.01); *Y02T 10/7011* (2013.01)

(56) References Cited

U.S. PATENT DOCUMENTS

| | | | |
|---|---|---|---|
| 5,462,566 A | 10/1995 | Skotheim | |
| 5,792,575 A | 8/1998 | Naoi | |
| 6,200,704 B1* | 3/2001 | Katz | H01M 4/02 429/218.1 |
| 6,225,002 B1 | 5/2001 | Nimon | |
| 6,869,729 B1* | 3/2005 | Pope | C08G 61/12 429/213 |
| 8,268,197 B2 | 9/2012 | Singh et al. | |
| 8,563,168 B2 | 10/2013 | Balsara et al. | |
| 8,598,273 B2 | 12/2013 | Eitouni et al. | |
| 8,691,928 B2 | 4/2014 | Hsieh et al. | |
| 8,889,301 B2 | 11/2014 | Balsara et al. | |
| 9,048,507 B2 | 6/2015 | Eitouni et al. | |
| 9,136,562 B2 | 9/2015 | Singh et al. | |
| 2002/0045102 A1* | 4/2002 | Jung | H01M 4/02 429/324 |
| 2002/0106561 A1 | 8/2002 | Lee et al. | |
| 2004/0030580 A1 | 2/2004 | Byleveld | |
| 2004/0059016 A1* | 3/2004 | Nishikitani | H01B 1/122 523/1 |
| 2004/0131934 A1* | 7/2004 | Sugnaux | H01M 4/13 429/209 |
| 2009/0075176 A1 | 3/2009 | Singh et al. | |
| 2009/0294307 A1 | 12/2009 | Liu et al. | |
| 2010/0227224 A1 | 9/2010 | Eitouni et al. | |
| 2010/0239918 A1 | 9/2010 | Pratt et al. | |
| 2011/0003201 A1 | 1/2011 | Tsukagoshi et al. | |
| 2011/0003211 A1 | 1/2011 | Hudson et al. | |
| 2011/0206994 A1 | 8/2011 | Balsara et al. | |
| 2011/0256450 A1 | 10/2011 | Campbell et al. | |
| 2011/0281173 A1* | 11/2011 | Singh | H01M 2/16 429/306 |
| 2011/0318654 A1 | 12/2011 | Janssen | |
| 2013/0065128 A1 | 3/2013 | Li et al. | |
| 2014/0030580 A1 | 1/2014 | Tenzer et al. | |
| 2014/0030603 A1 | 1/2014 | Wegner | |
| 2014/0127589 A1* | 5/2014 | Wegner | H01M 4/36 429/332 |
| 2015/0280218 A1 | 10/2015 | Zimmerman et al. | |

FOREIGN PATENT DOCUMENTS

| | | |
|---|---|---|
| WO | 2010083325 A1 | 7/2010 |
| WO | 2010083330 A1 | 7/2010 |
| WO | 2015153729 A1 | 10/2015 |

OTHER PUBLICATIONS

Yongzhu Fu and Arumugam Manthiram, Core-Shell structured sulfur-polypyrrole composite cathode for lithium-sulfur batteries, May 2, 2012 Royal Society of Chemistry 2012.*
Evers et al., New Approaches for High Energy Density lithium-Sulfur Battery: Accounts of Chemical Research, Oct. 10, 2012, p. 1135-1143.
International Search Report for International Application No. PCT/US/14/62415, dated Apr. 29, 2015.
Wim De Graaf, et al., "Laboratory simulation of natural sulphurization: I. Formation of monomeric and oligomeric isoprenoid polysulphides by low-temperature reactions of inorganic polysulphides with phytol and phytadienes," Geochimica et Cosmochimica Acta vol. 56, pp. 4321-4328 (1992).
Wim De Graff et al., "Low-temperature addition of hydrogen polysulfides to olefins: formation of 2,2'-dialkyl polysulfides from alk-1-enes and cyclic (poly)sulfides and polymeric organic sulfur compounds from a,w-dienes," J. Chem. Soc. Perkin Trans.,1995, p. 635.
Glenn Carroll, "Polysulfides—Nature's Organic Soluble Sulfur," Phosphorus, Sulfur, and Silicon, 1994 vol. 95-96, pp. 517-518.
Joongpyo Shim, Kathryn A. Striebel, and Elton J. Cairns, The Lithium-Sulfur Rechargeable Cell: Effects of Electrode Composition and Solvent on Cell Performance, Journal of The Electrochemical Society, 149 (10) A1321-A1325 (2002).
Jeon, Yeon, Kim, and Chung, "Preparation and electrochemical properties of lithium-sulfur polymer batteries," Journal of Power Sources 109 (2002) 89-97.
Takeshi Kobayashia, Yuki Imadea, Daisuke Shishiharaa, et al., "All solid-state battery with sulfur electrode and thio-LISICON electrolyte," Journal of Power Sources 182 (2008) 621-625.
D. Marmorstein, T.H. Yu, K.A. Striebel, F.R. McLarnon, J. Hou, and E.J. Cairns, "Electrochemical performance of lithium-sulfur cells with three different polymer electrolytes," Journal of Power Sources 89 (2000) 219-226.
F. Tudron, J. Akridge and V. Puglisi, "Lithium -Sulphur Rechargeable Batteries: Characteristics, State of Development and Applicability to Powering Portable Electronics", Proceedings of the 41st Power Sources Conference (Jun. 2004).
Jiulin Wang, Lu Liu, Zhijun Ling, et al., "Polymer lithium cells with sulfur composites as cathode materials," Electrochimica Acta 48 (2003) 1861-1867.
"All-solid lithium-sulfur battery stores four times the energy of lithium-ions". Gizmag.com. Jun. 7, 2013.
"New lithium/sulfur battery doubles energy density of lithium-ion". Gizmag.com. Dec. 1, 2013.
"Researchers increase lifespan of lithium-sulfur batteries". Gizmag.com. Apr. 4, 2013.
Caryl Richards, :Radical approach to turn sulfur into polymers, Chemistry World, Apr. 16, 2013.
Chung, W. J.; Griebel, J. J.; Kim, E. T.; Yoon, H.; Simmonds, A. G.; Ji, H. J.; Dirlam, P. T.; Glass, R. S.; Wie, J. J.; Nguyen, N. A.; Guralnick, B. W.; Park, J.; Somogyi, A. D.; Theato, P.; MacKay, M. E.; Sung, Y. E.; Char, K.; Pyun, J. (2013). "The use of elemental sulfur as an alternative feedstock for polymeric materials". Nature Chemistry 5 (6): 518-624. doi:10.1038/nchem.1624.PMID 23695634. edit.
Evers et al., New Approaches for High Energy Density lithium-Sulfur Battery: Accounts of Chemical Research, Oct. 10, 2012 (Oct. 10, 2012), abstract, p. 1135-1143.
Guangyuan, Zheng; Yuan Yang, Judy J. Cha, Seung Sae Hong, Yi Cui (Sep. 14, 2011). "Hollow Carbon Nanofiber-Encapsulated Sulfur Cathodes for High Specific Capacity Rechargeable Lithium Batteries". Nano Letters: 4462-4467. Bibcode:2011NanoL..11. 4462Z. doi:10.1021/nl2027684.
Ikeda, "Ionic Conductivity of Polymer Solid Electrolyte Prepared from Poly[epichlorohydrin-co-(Ethylene Oxide)] of High Ethylene Oxide Content," Journal of Applied Polymer Science, vol. 95, 178-184 (2005).
International Search Report for Application No. PCT/US14162415.
Keller, Sarah Jane (Oct. 4, 2011). "Sulfur in hollow nanofibers overcomes challenges of lithium-ion battery design". News (Stanford, CA, USA: Stanford University). Retrieved Feb. 18, 2012.
Lin, Z., Liu, Z., Fu, W., Dudney, N. J. and Liang, C. (2013), Lithium Polysulfidophosphates: A Family of Lithium-Conducting Sulfur-Rich Compounds for Lithium—Sulfur Batteries . Angew. Chem. Int. Ed., 52: 7460-7463. doi: 10.1002/anie.201300680.
SLAC National Accelerator Laboratory (6 Posts) (Jan. 8, 2013). "World-Record Battery Performance Achieved With Egg-Like Nanostructures". CleanTechnica. Retrieved Jun. 11, 2013.
Wei Seh, Z.; Li, W.; Cha, J. J.; Zheng, G.; Yang, Y.; McDowell, M. T.; Hsu, P. C.; Cui, Y. (2013). "Sulphur—TiO2 yolk—shell nanoarchitecture with internal void space for long-cycle lithium—sulphur batteries". Nature Communications 4: 331. doi:10.1038/ncomms2327. PMID 23299881.
Xiulei Ji, Kyu Tae Lee, and Linda F. Nazar. (May 17, 2009)"A highly ordered nanostructured carbon-sulphur cathode for lithium-sulphur batteries." Nature Materials.

(56) References Cited

OTHER PUBLICATIONS

Zhang, Jiawei et al., "Novel PEO-based solid composite polymer electrolytes with inorganic-organic hybrid polyphosphazene microspheres as fillers," Journal of Applied Electrochemistry, vol. 40, pp. 1475-1481, Apr. 10, 2010.
Machine translation of JP2013229257 from the Japanese Platform for Patent Information.
Extended European search report, dated Aug. 29, 2017, for EP application 14889681.4 (PCT/US2014062415).

* cited by examiner

LONG CYCLE LIFE LITHIUM SULFUR ELECTROCHEMICAL CELLS

CROSS-REFERENCE TO RELATED APPLICATIONS

This application claims priority to U.S. Provisional Patent Application 61/817,248, filed Apr. 29, 2013, which is incorporated by reference herein.

BACKGROUND

The demand for rechargeable batteries has grown by leaps and bounds as the global demand for technological products such as cellular phones, laptop computers and other consumer electronic products has escalated. In addition, interest in rechargeable batteries has been fueled by current efforts to develop green technologies such as electrical-grid load leveling devices and electrically-powered vehicles, which are creating an immense potential market for rechargeable batteries with high energy densities and long calendar and cycle life.

Li-ion batteries are some of the most popular types of rechargeable batteries for portable electronics. Li-ion batteries offer high energy and power densities and slow loss of charge when not in use. In addition, they do not suffer from memory effects. Because of these benefits, Li-ion batteries have been used increasingly in defense, aerospace, back-up storage, and transportation applications.

Despite the push for better performance and lower cost in lithium ion batteries, there has been little change to the basic architecture of lithium ion cells, and, in particular, little change to the design of cell electrodes. A porous electrode active film has electrode active material particles and conductive particles bound together with polymer binder. This film is usually deposited onto a metallic current collector. Liquid electrolyte is soaked into the porous film. The pores ensure that there is a large surface area for charge transfer between the electrode active material and the liquid electrolyte.

Lithium-sulfur couples have been studied as they have the potential to produce batteries with higher capacity and higher energy than conventional Li-ion batteries. However, there are many problems with these systems. One problem is that sulfur is very soluble in typical liquid electrolytes. In a conventional sulfur-based electrochemical cell system, the sulfur in the cathode (in the form of polysulfides, for example) dissolves in the electrolyte and diffuses to the anode where it reacts with the lithium to form lithium sulfides. Trapped at the anode in the reduced state, the sulfur cannot be reoxidized to the original form and be returned to the cathode. This leads to rapid capacity fade and high impedance, resulting ultimately in cell death.

Another problem associated with lithium-sulfur systems arises from loss of surface area in the electrodes. During cycling, sulfur in the electrode region aggregates into larger particles, permanently changing the morphology of the cathode. The change in morphology results in reduced ionic and electronic conductivity. Thus it has not been possible to produce viable battery systems from lithium-sulfur couples.

It would be useful to construct a battery in which sulfur could be used as the active cathode material in order to exploit the high capacity and high energy that sulfur can provide.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

Figure 1:
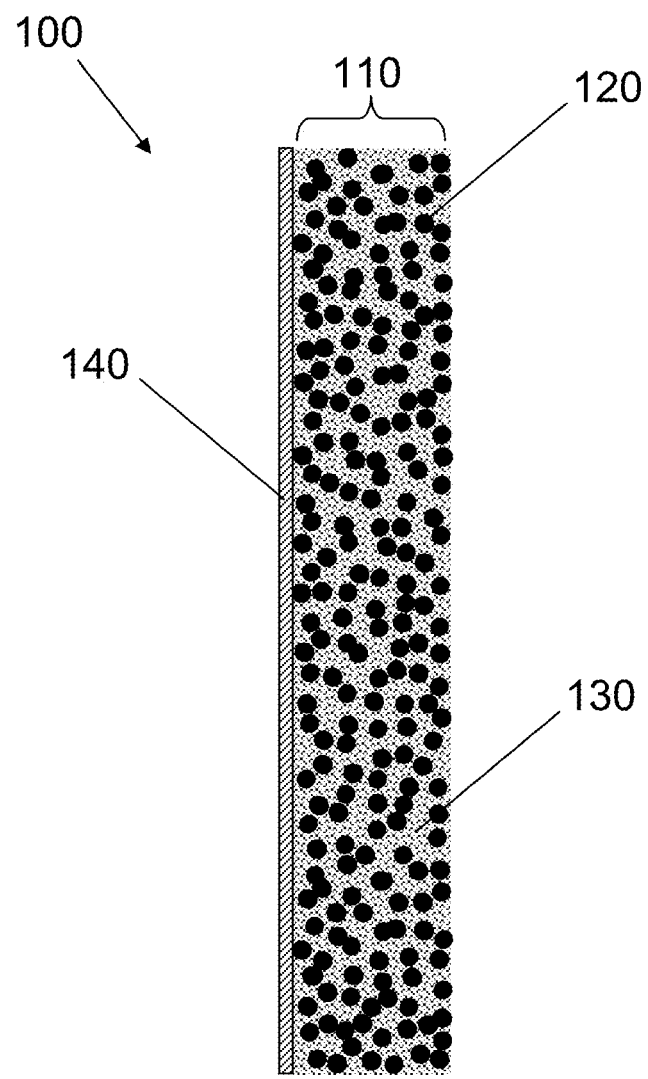
FIG. 1 is a schematic drawing of a positive electrode for an electrochemical cell.

In one embodiment of the invention, an electrode comprising a sulfur containing and sequestering matrix, an electronically conducting agent; and a first solid polymer electrolyte is disclosed. The containing and sequestering matrix, the electronically conducting agent, and the first solid polymer electrolyte are all mixed together to form an electrode active film.

In one arrangement, the sulfur is physically sequestered in the sequestering matrix. The sequestering matrix may contain PVDF or the sequestering matrix may contain a second solid polymer electrolyte. In some arrangements, the first solid polymer electrolyte and the second solid polymer electrolyte are the same.

In another arrangement, the sulfur is chemically bound to the sequestering matrix. The sequestering matrix may contain one or more electronically conductive materials such as carbon black, graphite, conductive carbons, and conductive polymers. Examples of suitable conductive polymers include, but are not limited to, polythiophene, polyphenylene vinylene, polypyrrole, polyphenylene sulfide, and cyclized polyacrylonitrile (i.e., polyacrylonitrile with ring structures).

In one embodiment of the invention, the cathode and is adapted for use with an anode comprising Li metal. In one arrangement, there is also a current collector adjacent to the electrode active film. In one arrangement, the cathode contains no fluorinated polymers.

In one embodiment of the invention, the first and optionally, the second, solid polymer electrolyte comprises a block copolymer. The solid polymer electrolyte may further include at least one lithium salt.

In another embodiment of the invention, an electrochemical cell that has a cathode as described above, a lithium-containing anode and a solid polymer electrolyte positioned between the cathode and the anode is disclosed. The anode may be a lithium metal film with a thin (<5 um) single ion conductor coating.

DETAILED DESCRIPTION OF THE EMBODIMENTS OF THE INVENTION

The disclosure herein relates generally to design of an electrochemical cell. More specifically, embodiments of the invention provide for a lithium-sulfur electrode couple and a polymeric separator which offer enhanced energy and increased cycle life capabilities over traditional lithium-sulfur battery cells.

In this disclosure, the terms "negative electrode" and "anode" are both used to mean "negative electrode". Likewise, the terms "positive electrode" and "cathode" are both used to mean "positive electrode".

In some embodiments of the invention, the effectiveness of the sulfur-based electrode and polymeric electrolyte separator system disclosed herein may be attributed to the polymer-based electrolyte material acting as a sulfur diffusion barrier. In addition, the electrode design sequesters the sulfur in the cathode, minimizing the loss of active material in the cathode. Thus some of the most important problems with lithium-sulfur batteries can be overcome. Such a battery with a sulfur-based electrode offers enhanced energy and cycle life capabilities. Sulfur-containing cathodes coupled with lithium-containing anodes and a solid polymer based electrolyte can make an electrochemical cell that can be cycled extensively without significant capacity fade.

In one embodiment of the invention, an exemplary sulfur-based cathode is coupled with a dry solid polymer electrolyte instead of a conventional liquid electrolyte. The dry, solid polymer electrolyte acts as a diffusion barrier for the sulfur both within the cathode and between the cathode and anode, thus preventing the sulfur diffusion that leads to the capacity fade that occurs in conventional liquid electrolyte based cell systems. The sulfur is physically sequestered in the cathode, preventing sulfur agglomerates from forming and preventing sulfur from leaching into the separator polymer electrolyte, while still allowing lithium ions to be transported between the anode and cathode. In one embodiment the sulfur is in the form of elemental sulfur and is physically sequestered in the cathode by trapping it in a crystalline polymer such as PVDF. In another embodiment the sulfur-based active material consists of sulfur that is chemically sequestered by covalently binding to an electronically conductive material. Examples of such electronically conductive materials are carbon black, graphite, and conductive polymers. Examples of suitable conductive polymers are polythiophene, polyphenylene vinylene, polypyrrole, polyphenylene sulfide, and cyclized polyacrylonitrile.

In general, a solid polymer electrolyte based lithium-sulfur electrochemical cell can be adapted to increase current collector utilization, trim down inactive weight and volume, and cut down manufacturing costs, providing for long cycle life and high sulfur utilization.

FIG. 1 is a cross-sectional schematic drawing of an electrode assembly 100 that includes an electrode film 110 and a current collector 140, according to an embodiment of the invention. The electrode film 110 has sulfur-containing electrode active material particles 120 embedded in a matrix of solid polymer electrolyte 130 that also contains small, electronically-conductive particles (as indicated by small grey dots) such as carbon black. The sulfur-containing (cathode) materials can be used in electrochemical cells having lithium or sodium anodes. In one arrangement, the anode is a lithium metal film with a thin (<5 um) single ion conductor coating. Examples of sulfur-containing cathode materials include, but are not limited to elemental sulfur, organo-sulfur, polymer-bound sulfur, and carbon-sulfur compositions. The solid polymer electrolyte 130 can be a polymer, a copolymer, or a blend thereof. In one arrangement, the solid polymer electrolyte 130 is a block copolymer electrolyte. In one arrangement, no additional binder material is added; the electrolyte 130 binds together the electrode active particles and the electronically-conductive particles and may provide sufficient mechanical integrity to the electrode film 110. The block copolymer electrolyte 130 includes an ionically-conductive phase and a structural phase so that overall the block copolymer electrolyte has a modulus greater than about $1 \times 10^5$ Pa at 25° C. In some arrangements, the block copolymer electrolyte 130 has a modulus greater than about $1 \times 10^6$ Pa at 25° C. In some arrangements, the block copolymer electrolyte 130 has a modulus greater than about $1 \times 10^7$ Pa at 25° C. In another arrangement, the electrode film 110 contains a small amount of an additional binder material, such as poly(vinylidene fluoride) or other fluorinated polymers to add strength to the film 110.

When a solid polymer electrolyte 130 is used, the electrolyte 130 cannot leak out of the electrode film 110, and there is no need for the current collector 140 to act as a barrier to hold liquid electrolyte within the electrode film 110. In some embodiments of the invention, the electrode film 110 has sufficient mechanical integrity to be freestanding. This makes it possible to use a very thin or reticulated metal current collector, whose only function is electronic conduction, thus reducing unnecessary weight and volume in the electrode assembly 100. Exemplary current collector materials include aluminum and copper.

In one embodiment, a sulfur cathode is prepared in a manner similar to conventional cathodes. A sulfur-based active material is mixed with the carbon black. Examples of sulfur-containing cathode materials include, but are not limited to elemental sulfur, organo-sulfur, polymer-bound sulfur, and carbon-sulfur compositions. The process includes intimate mixing, which can be achieved either by high energy ball milling and/or by heating the mixture above the melting point of sulfur. The process includes adding the mixture to a solution of solid polymer (e.g., block copolymer) electrolyte and salt in an appropriate solvent, such as NMP. The process includes sonicating and/or homogenizing the solution to ensure an even distribution of all the components. The process includes casting a solution mixture onto a metallic current collector such as aluminum. In other embodiments, preparation of the sulfur cathode can involve other techniques, such as vapor deposition, compression molding, or extrusion of the sulfur based active material with carbon black and binder. Forming an electrochemical cell involves drying the cathode is and interfacing it with a layer of electrolyte and an anode, such as one containing lithium or sodium.

Figure 2:
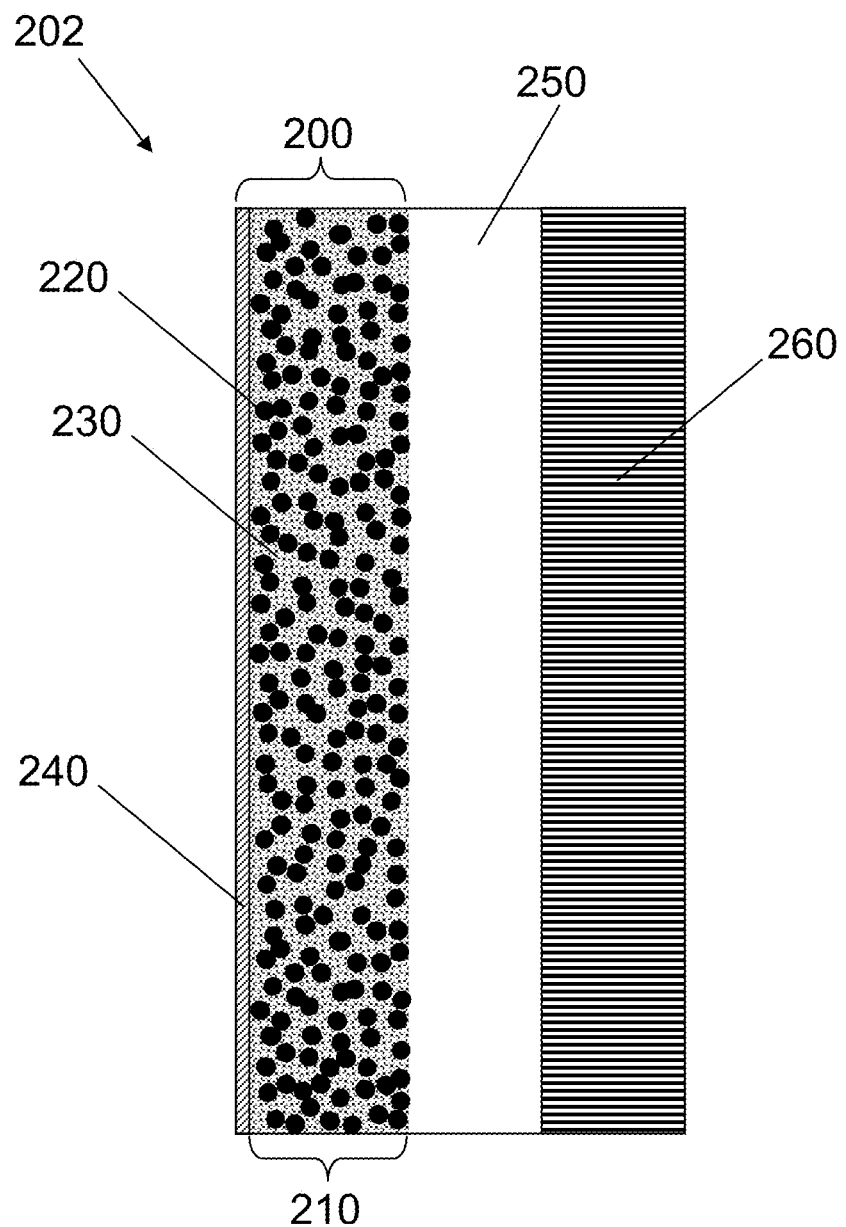
FIG. 2 is a schematic drawing of an electrochemical cell that has one positive electrode and one negative electrode, according to an embodiment of the invention.

FIG. 2 is a cross-sectional schematic drawing of an electrochemical cell 202 with a positive electrode assembly 200 as described above in FIG. 1, according to an embodiment of the invention. The positive electrode assembly 200 has a positive electrode film 210 and a current collector 240. The positive electrode film 210 has positive electrode sulfur-containing active material particles 220 embedded in a matrix of solid electrolyte 230 that also contains small, electronically-conductive particles (as indicated by small grey dots) such as carbon black. The solid polymer electrolyte 230 can be a polymer, a copolymer, or a blend thereof. In one arrangement, the solid polymer electrolyte 230 is a block copolymer electrolyte. There is a positive electrode current collector 240 that may be a continuous or reticulated metal film as described above. There is a negative electrode 260 that is a metal or metal alloy layer, such as one containing lithium or sodium, that acts as both negative electrode active material and negative electrode current collector. In one arrangement (not shown), the negative electrode is a negative electrode assembly that includes a reticulated film of negative electrode material covered with a solid polymer electrolyte. The solid polymer electrolyte may or may not be the same as the solid polymer electrolyte 230 in the positive assembly 200. There is a separator region 250 filled with an electrolyte that provides ionic communication between the positive electrode film 210 and the negative electrode 260. In one arrangement, the separator region 250 contains a solid electrolyte and can be the same solid electrolyte (without the carbon particles) as is used in the positive electrode film 210 and/or in the negative electrode assembly.

Figure 3:
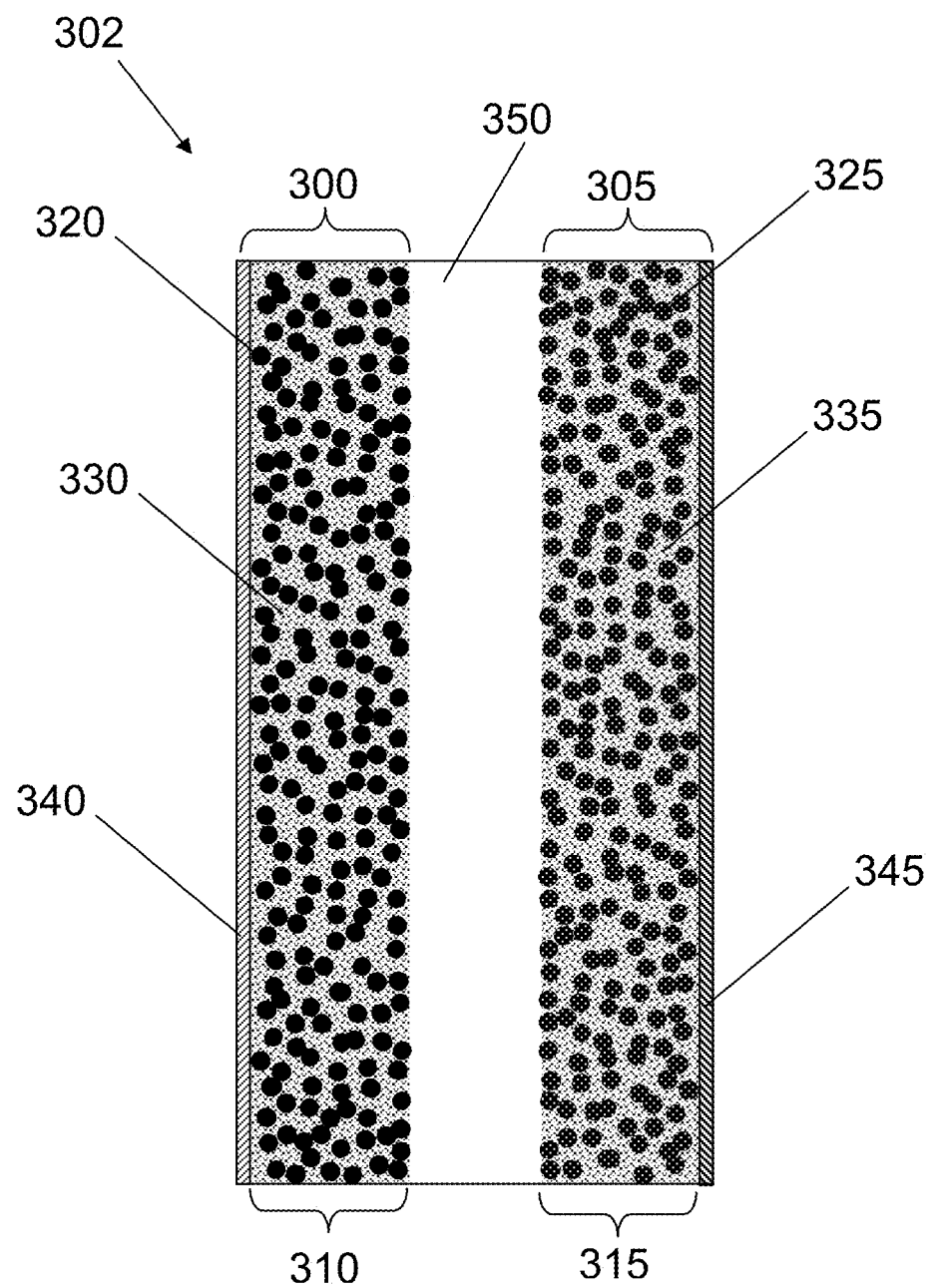
FIG. 3 is a schematic drawing of an electrochemical cell that has one positive electrode and one different negative electrode, according to an embodiment of the invention.

FIG. 3 is a cross-sectional schematic drawing of an electrochemical cell 302 with both a positive electrode assembly 300 as described above in FIG. 1 and a negative electrode assembly 305, according to an embodiment of the invention. The positive electrode assembly 300 has a positive electrode film 310 and a current collector 340. The positive electrode film 310 has positive electrode sulfur-containing active material particles 320 embedded in a matrix of solid polymer electrolyte 330 that also contains small, electronically-conductive particles (as indicated by small grey dots) such as carbon black. The solid polymer electrolyte 330 can be a polymer, a copolymer, or a blend thereof. In one arrangement, the solid polymer electrolyte 330 is a block copolymer electrolyte. There is a positive electrode current collector 340 that may be a continuous or reticulated metal film as described above. The negative electrode assembly 305 has a negative electrode film 315 and a current collector 345. The negative electrode film 315 has negative electrode active material particles 325 embedded in a matrix of solid polymer electrolyte 335 that may also contains small, electronically-conductive particles (as indicated by small grey dots) such as carbon black. The solid polymer electrolyte 335 can be a polymer, a copolymer, or a blend thereof. In one arrangement, the solid polymer electrolyte 335 is a block copolymer electrolyte. The electrolytes 330, 335 may or may not be the same. There is a negative electrode current collector 345 that may be a continuous or reticulated metal film as described above. There is a separator region 350 filled with an electrolyte that provides ionic communication between the positive electrode film 310 and the negative electrode film 315. In one arrangement, the separator region 350 contains a solid electrolyte and can be the same solid electrolyte (without the carbon particles) as is used in the positive electrode film 310 and/or in the negative electrode film 315. In one arrangement, the negative electrode active material particles 325 are graphite. In another arrangement, the negative electrode active material particles 325 are lithium titanate.

The relative ratios of the material components used in a sulfur-containing electrode can be varied for specific applications. In one embodiment, an exemplary electrode active film includes 50% to 80% sulfur, 15% to 20% carbon black, and 10% to 35% block copolymer. In one arrangement, the electronically conducting agent in the cathode is acetylene black or other carbon as is known in the art. In one arrangement, the cathode current collector has a thickness less than about 10 microns. In another arrangement, the cathode current collector has a thickness less than about 5 microns. The current collector may have the form of a grid, a mesh, or a semi-continuous film.

In one embodiment of the invention, the cathode does not include any poly(vinylidene fluoride). In one arrangement, the cathode does not include any fluorinated polymers.

Nanostructured Block Copolymer Electrolytes

As described in detail above, a block copolymer electrolyte can be used in the embodiments of the invention.

Figure 4A:
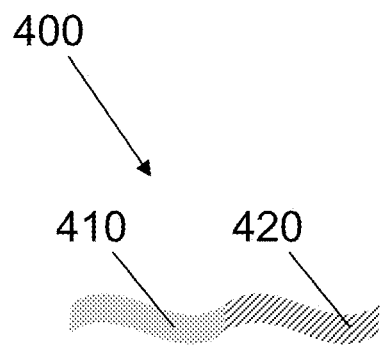
FIG. 4A is a simplified illustration of an exemplary diblock copolymer molecule.

FIG. 4A is a simplified illustration of an exemplary diblock copolymer molecule 400 that has a first polymer block 410 and a second polymer block 420 covalently bonded together. In one arrangement both the first polymer block 410 and the second polymer block 420 are linear polymer blocks. In another arrangement, either one or both polymer blocks 410, 420 has a comb (or branched) structure. In one arrangement, neither polymer block is cross-linked. In another arrangement, one polymer block is cross-linked. In yet another arrangement, both polymer blocks are cross-linked.

Figure 4B:
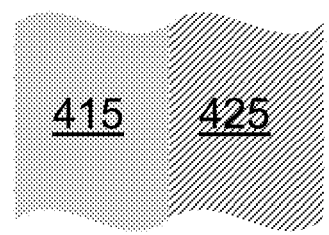
FIG. 4B is a schematic drawing that shows how multiple diblock copolymer molecules can arrange themselves to form a first domain of a first phase made of first polymer blocks and a second domain of a second phase made of second polymer blocks.
Figure 4C:
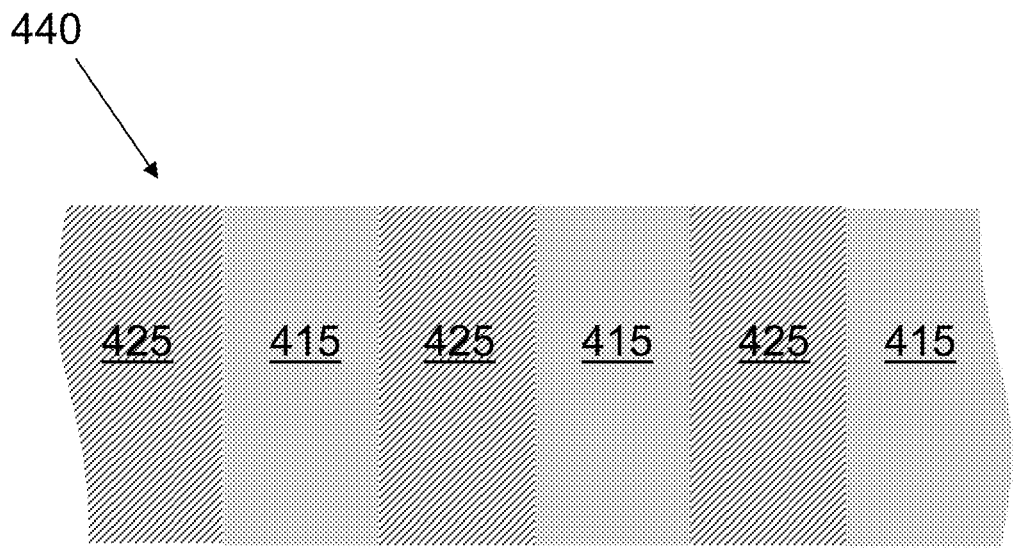
FIG. 4C is a schematic drawing that shows how diblock copolymer molecules can arrange themselves to form multiple repeat domains.

Multiple diblock copolymer molecules 400 can arrange themselves to form a first domain 415 of a first phase made of the first polymer blocks 410 and a second domain 425 of a second phase made of the second polymer blocks 420, as shown in FIG. 4B. Diblock copolymer molecules 400 can arrange themselves to form multiple repeat domains, thereby forming a continuous nanostructured block copolymer material 440, as shown in FIG. 4C. The sizes or widths of the domains can be adjusted by adjusting the molecular weights of each of the polymer blocks.

In one arrangement the first polymer domain 415 is ionically conductive, and the second polymer domain 425 provides mechanical strength to the nanostructured block copolymer.

Figure 5A:
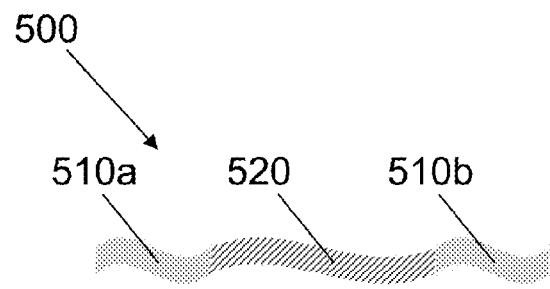
FIG. 5A is a simplified illustration of an exemplary triblock polymer molecule that has a first polymer block, a second polymer block, and a third polymer block that is the same as the first polymer block.

FIG. 5A is a simplified illustration of an exemplary triblock polymer molecule 500 that has a first polymer block 510a, a second polymer block 520, and a third polymer block 510b that is the same as the first polymer block 510a, all covalently bonded together. In one arrangement the first polymer block 510a, the second polymer block 520, and the third copolymer block 510b are linear polymer blocks. In another arrangement, either some or all polymer blocks 510a, 520, 510b have a comb (or branched) structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 5B:
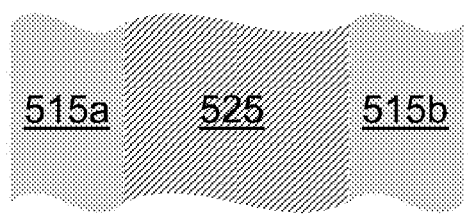
FIG. 5B is a schematic drawing that shows how multiple triblock polymer molecules can arrange themselves to form a first domain of a first phase, a second domain of a second phase, and a third domain of a first phase.
Figure 5C:
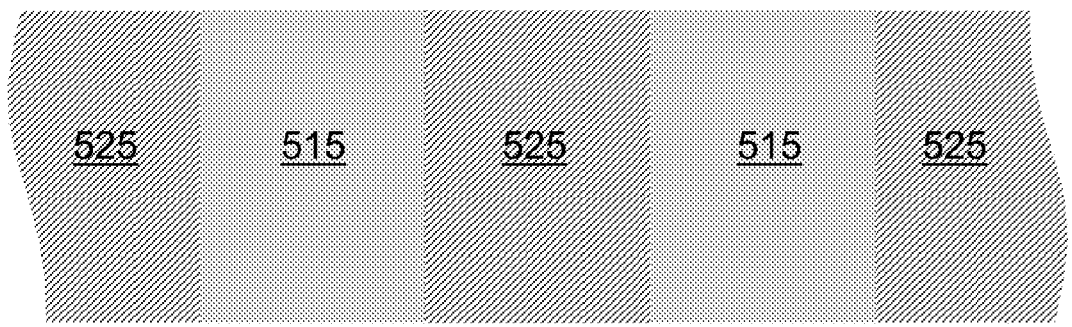
FIG. 5C is a schematic drawing that shows how triblock polymer molecules can arrange themselves to form multiple repeat domains, thereby forming a continuous nanostructured block copolymer.

Multiple triblock polymer molecules 500 can arrange themselves to form a first domain 515a of a first phase made of the first polymer blocks 510a, a second domain 525 of a second phase made of the second polymer blocks 520, and a third domain 515b of a first phase made of the third polymer blocks 510b as shown in FIG. 5B. Triblock polymer molecules 500 can arrange themselves to form multiple repeat domains 525, 515 (containing both 515a and 515b), thereby forming a continuous nanostructured block copolymer 540, as shown in FIG. 5C. The sizes of the domains can be adjusted by adjusting the molecular weights of each of the polymer blocks.

In one arrangement the first and third polymer domains 515a, 515b are ionically conductive, and the second polymer domain 525 provides mechanical strength to the nanostructured block copolymer. In another arrangement, the second polymer domain 525 is ionically conductive, and the first and third polymer domains 515 provide a structural framework.

Figure 6A:
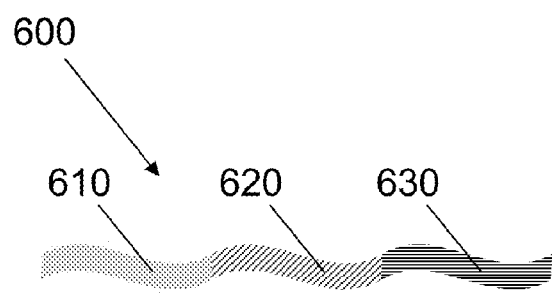
FIG. 6A is a simplified illustration of another exemplary triblock copolymer molecule that has a first polymer block, a second polymer block, and a third polymer block, different from either of the other two polymer blocks.

FIG. 6A is a simplified illustration of another exemplary triblock copolymer molecule 600 that has a first polymer block 610, a second polymer block 620, and a third polymer block 630, different from either of the other two polymer blocks, all covalently bonded together. In one arrangement the first polymer block 610, the second polymer block 620, and the third copolymer block 630 are linear polymer blocks. In another arrangement, either some or all polymer blocks 610, 620, 630 have a comb (or branched) structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 6B:
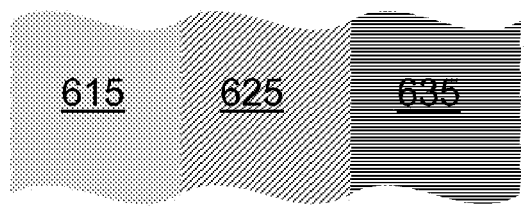
FIG. 6B is a schematic drawing that shown how multiple triblock copolymer molecules can arrange themselves to form a first domain of a first phase, a second domain of a second phase, and a third domain of a third phase.
Figure 6C:
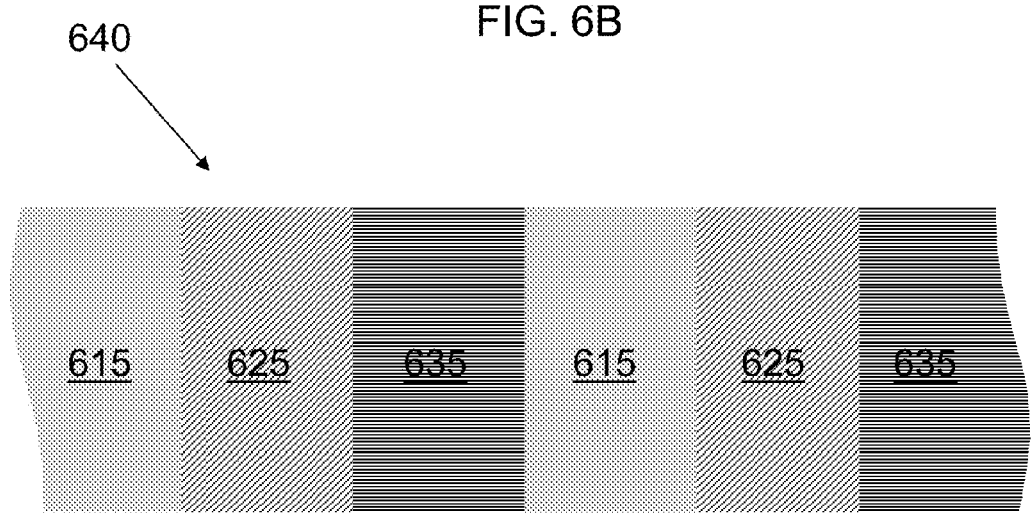
FIG. 6C is a schematic drawing that shown how triblock polymer molecules can arrange themselves to form multiple repeat domains, thereby forming a continuous nanostructured block copolymer.

Multiple triblock copolymer molecules 600 can arrange themselves to form a first domain 615 of a first phase made of the first polymer blocks 610, a second domain 625 of a second phase made of the second polymer blocks 620, and a third domain 635 of a third phase made of the third polymer blocks 630 as shown in FIG. 6B. Triblock polymer molecules 600 can arrange themselves to form multiple repeat domains, thereby forming a continuous nanostructured block copolymer 640, as shown in FIG. 6C. The sizes of the domains can be adjusted by adjusting the molecular weights of each of the polymer blocks.

In one arrangement the first polymer domains 615 are ionically conductive, and the second polymer domains 625 provide mechanical strength to the nanostructured block copolymer. The third polymer domains 635 provides an additional functionality that may improve mechanical strength, ionic conductivity, chemical or electrochemical stability, may make the material easier to process, or may provide some other desirable property to the block copolymer. In other arrangements, the individual domains can exchange roles.

Choosing appropriate polymers for the block copolymers described above is important in order to achieve desired electrolyte properties. In one embodiment, the conductive polymer (1) exhibits ionic conductivity of at least $10^{-5}$ Scm$^{-1}$ at electrochemical cell operating temperatures when combined with an appropriate salt(s), such as lithium salt(s); (2) is chemically stable against such salt(s); and (3) is thermally stable at electrochemical cell operating temperatures. In one embodiment, the structural material has a modulus in excess of $1 \times 10^5$ Pa at electrochemical cell operating temperatures. In one embodiment, the third polymer (1) is rubbery; and (2) has a glass transition temperature lower than operating and processing temperatures. It is useful if all materials are mutually immiscible.

In one embodiment of the invention, the conductive phase can be made of a linear or branched polymer. Conductive linear or branched polymers that can be used in the conductive phase include, but are not limited to, polyethers, polyamines, polyimides, polyamides, alkyl carbonates, polynitriles, and combinations thereof. The conductive linear or branched polymers can also be used in combination with polysiloxanes, polyphosphazines, polyolefins, and/or polydienes to form the conductive phase.

In another exemplary embodiment, the conductive phase is made of comb (or branched)polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, other polar groups, and combinations thereof.

Further details about polymers that can be used in the conductive phase can be found in International Patent Application Number PCT/US09/45356, filed May 27, 2009, International Patent Application Number PCT/US09/54709, filed Aug. 22, 2009, International Patent Application Number PCT/US10/21065, filed Jan. 14, 2010, International Patent Application Number PCT/US10/21070, filed Jan. 14, 2010, U.S. International Patent Application Number PCT/US10/25680, filed Feb. 26, 2009, and U.S. International Patent Application Number PCT/US10/25690, filed Feb. 26, 2009, all of which are included by reference herein.

There are no particular restrictions on the electrolyte salt that can be used in the block copolymer electrolytes. Any electrolyte salt that includes the ion identified as the most desirable charge carrier for the application can be used. It is especially useful to use electrolyte salts that have a large dissociation constant within the polymer electrolyte.

Suitable examples include alkali metal salts, such as Li salts. Examples of useful Li salts include, but are not limited to, $LiPF_6$, $LiN(CF_3SO_2)_2$, $Li(CF_3SO_2)_3C$, $LiN(SO_2CF_2CF_3)_2$, $LiB(C_2O_4)_2$, $B_{12}F_xH_{12-x}$, $B_{12}F_{12}$, and mixtures thereof.

In one embodiment of the invention, single ion conductors can be used with electrolyte salts or instead of electrolyte salts. Examples of single ion conductors include, but are not limited to sulfonamide salts, boron based salts, and sulfates groups.

In one embodiment of the invention, the structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, fluorocarbons, such as polyvinylidene fluoride, or copolymers that contain styrene, methacrylate, or vinylpyridine.

Additional species can be added to nanostructured block copolymer electrolytes to enhance the ionic conductivity, to enhance the mechanical properties, or to enhance any other properties that may be desirable.

The ionic conductivity of nanostructured block copolymer electrolyte materials can be improved by including one or more additives in the ionically conductive phase. An additive can improve ionic conductivity by lowering the degree of crystallinity, lowering the melting temperature, lowering the glass transition temperature, increasing chain mobility, or any combination of these. A high dielectric additive can aid dissociation of the salt, increasing the number of Li+ ions available for ion transport, and reducing the bulky Li+ [salt] complexes. Additives that weaken the interaction between Li+ and PEO chains/anions, thereby making it easier for Li+ ions to diffuse, may be included in the conductive phase. The additives that enhance ionic conductivity can be broadly classified in the following categories: low molecular weight conductive polymers, ceramic particles, room temp ionic liquids (RTILs), high dielectric organic plasticizers, and Lewis acids.

Other additives can be used in the polymer electrolytes described herein. For example, additives that help with overcharge protection, provide stable SEI (solid electrolyte interface) layers, and/or improve electrochemical stability can be used. Such additives are well known to people with ordinary skill in the art. Additives that make the polymers easier to process, such as plasticizers, can also be used.

Further details about block copolymer electrolytes are described in U.S. patent application Ser. No. 12/225,934, filed Oct. 1, 2008, U.S. patent application Ser. No. 12/271,1828, filed Nov. 14, 2008, and International Patent Application Number PCT/US09/31356, filed Jan. 16, 2009, all of which are included by reference herein.

The embodiments of the invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. An electrode comprising:
   sulfur-containing active material comprising sulfur covalently bonded polyphenylene vinylene;
   an electronically conducting material; and
   a first solid polymer electrolyte;
   wherein the sulfur-containing active material, the electronically conducting material, and the first solid polymer electrolyte are all mixed together to form an electrode active film.

2. The electrode of claim 1 wherein the electronically conductive material comprises one or more selected from the group consisting of carbon black, graphite, conductive carbons, and conductive polymers.

3. The electrode of claim 1 wherein the electronically conductive material comprises a polymer selected from the group consisting of polythiophene, polyphenylene vinylene, polypyrrole, polyphenylene sulfide, and cyclized polyacrylonitrile.

4. The electrode of claim 1 wherein the electrode is a cathode and is adapted for use with an anode comprising Li metal.

5. The electrode of claim 1, further comprising a current collector adjacent to the electrode active film.

6. The electrode of claim 1 wherein the electrode contains no fluorinated polymers.

7. The electrode of claim 1 wherein the first solid polymer electrolyte further comprises at least one lithium salt.

8. The electrode of claim 1 wherein the first solid polymer electrolyte comprises a block copolymer.

9. The electrode of claim 4 wherein the block copolymer is either a diblock copolymer or a triblock copolymer.

10. The electrode of claim 9 wherein a first block of the block copolymer is ionically conductive and is selected from the group consisting of polyethers, polyamines, polyimides, polyamides, alkyl carbonates, polynitriles, polysiloxanes, polyphosphazines, polyolefins, polydienes, and combinations thereof.

11. The electrode of claim 9 wherein a first block of the block copolymer comprises an ionically-conductive comb polymer, which comb polymer comprises a backbone and pendant groups.

12. The electrode of claim 11 wherein the backbone comprises one or more selected from the group consisting of polysiloxanes, polyphosphazines, polyethers, polydienes, polyolefins, polyacrylates, polymethacrylates, and combinations thereof.

13. The electrode of claim 11 wherein the pendants comprise one or more selected from the group consisting of oligoethers, substituted oligoethers, nitrile groups, sulfones, thiols, polyethers, polyamines, polyimides, polyamides, alkyl carbonates, polynitriles, other polar groups, and combinations thereof.

14. The electrode of claim 9 wherein a second block of the block copolymer is selected from the group consisting of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, fluorocarbons, polyvinylidene fluoride, and copolymers that contain styrene, methacrylate, and/or vinylpyridine.

15. An electrochemical cell comprising
   a cathode comprising the electrode of claim 1;
   an anode comprising lithium; and
   a second solid polymer electrolyte positioned between the cathode and the anode and providing ionic communication there between.

16. The cell of claim 15 wherein the anode comprises a lithium metal film that has a single ion conductor coating whose thickness is less than 5 um.

17. The cell of claim 15 wherein the cathode comprises between about 30% and 80% sulfur by weight.

18. The cell of claim 15 wherein the first solid polymer electrolyte and the second solid polymer electrolyte are the same.

19. The cell of claim 15 wherein the cathode contains no fluorinated polymers.

* * * * *